(12) United States Patent
Ahn et al.

(10) Patent No.: US 8,681,135 B2
(45) Date of Patent: Mar. 25, 2014

(54) PHOTO SENSOR AND ORGANIC LIGHT EMITTING DISPLAY USING THE SAME

(75) Inventors: Soon-Sung Ahn, Yongin (KR); Do-Youb Kim, Yongin (KR); Sun-A Yang, Yongin (KR); Dong-Wook Choi, Yongin (KR); Joo-Hyeon Jeong, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 1065 days.

(21) Appl. No.: 12/504,004

(22) Filed: Jul. 16, 2009

(65) Prior Publication Data
US 2010/0013811 A1    Jan. 21, 2010

(30) Foreign Application Priority Data
Jul. 17, 2008    (KR) .................. 10-2008-0069527

(51) Int. Cl.
*G06F 3/038*    (2013.01)
*G09G 5/00*    (2006.01)

(52) U.S. Cl.
USPC ........... 345/207; 250/206; 313/523; 315/149; 345/82

(58) Field of Classification Search
USPC .............. 345/76–83, 204–215; 250/206–210, 250/214; 313/523–544, 103 R, 103 CM, 313/104, 105 R, 105 CM; 315/149–159
See application file for complete search history.

(56) References Cited

U.S. PATENT DOCUMENTS

| | | | |
|---|---|---|---|
| 6,313,455 B1 * | 11/2001 | Afghahi | 250/208.1 |
| 6,369,737 B1 * | 4/2002 | Yang et al. | 341/155 |
| 6,384,394 B1 * | 5/2002 | Afghahi | 250/208.1 |
| 7,187,373 B2 | 3/2007 | Tobita | |
| 7,280,102 B2 * | 10/2007 | Abileah et al. | 345/204 |
| 7,423,639 B2 * | 9/2008 | Min | 345/207 |
| 7,495,202 B2 * | 2/2009 | Schrey et al. | 250/214 R |
| 7,534,983 B2 * | 5/2009 | Sugiyama | 250/208.1 |
| 7,595,795 B2 * | 9/2009 | Shin et al. | 345/207 |

(Continued)

FOREIGN PATENT DOCUMENTS

JP    2005-101798    4/2005
KR    10-2004-0084623 A    10/2004

*Primary Examiner* — Gene W Lee
(74) *Attorney, Agent, or Firm* — H.C. Park & Associates, PLC

(57) ABSTRACT

A photo sensor capable of reducing the distortion of signals output from the photo sensor to output a correct measured value and an organic light emitting display using the same. The organic light emitting display includes a pixel unit formed on a transparent substrate to display an image in response to scan signals and data signals, a scan driver generating the scan signals to transmit the scan signals to the pixel unit, a data driver generating the data signals to transmit the data signals to the pixel unit, and a photo sensor including a sensing unit sensing brightness of ambient light to output a sensing signal and a control unit for receiving the sensing signal to output a brightness control signal for controlling brightness of the image. The sensing unit disposed in a predetermined region of the transparent substrate and includes a first photo diode receiving a first driving power source to generate optical current so that a magnitude of the optical current is controlled in response to the brightness of the ambient light, a first capacitor for storing the optical current, and a first switch coupled between the first driving power source and the first photo diode to perform a switching operation.

18 Claims, 3 Drawing Sheets

(56) References Cited

U.S. PATENT DOCUMENTS

| | | | |
|---|---|---|---|
| 7,872,641 B2* | 1/2011 | Abileah et al. | 345/173 |
| 2002/0030152 A1* | 3/2002 | Afghahi | 250/208.1 |
| 2002/0130799 A1* | 9/2002 | Yang et al. | 341/138 |
| 2003/0080279 A1* | 5/2003 | Afghahi | 250/208.1 |
| 2003/0179323 A1* | 9/2003 | Abileah et al. | 349/24 |
| 2004/0113875 A1* | 6/2004 | Miller et al. | 345/82 |
| 2006/0007204 A1* | 1/2006 | Reddy et al. | 345/204 |
| 2006/0007205 A1* | 1/2006 | Reddy et al. | 345/204 |
| 2006/0007206 A1* | 1/2006 | Reddy et al. | 345/204 |
| 2006/0007248 A1* | 1/2006 | Reddy et al. | 345/690 |
| 2006/0007249 A1* | 1/2006 | Reddy et al. | 345/690 |
| 2006/0131483 A1* | 6/2006 | Schrey et al. | 250/214 R |
| 2007/0229452 A1* | 10/2007 | Sano et al. | 345/102 |
| 2007/0279384 A1* | 12/2007 | Brosnan | 345/166 |
| 2008/0049004 A1* | 2/2008 | Kunimori et al. | 345/207 |
| 2008/0055295 A1* | 3/2008 | Abileah et al. | 345/204 |
| 2008/0062156 A1* | 3/2008 | Abileah et al. | 345/204 |
| 2008/0062157 A1* | 3/2008 | Abileah et al. | 345/204 |
| 2008/0087799 A1* | 4/2008 | Sugiyama | 250/208.1 |
| 2008/0158211 A1* | 7/2008 | Kwon | 345/207 |
| 2008/0291430 A1* | 11/2008 | Nozawa | 356/73 |
| 2009/0015166 A1* | 1/2009 | Kwon | 315/156 |

\* cited by examiner

PHOTO SENSOR AND ORGANIC LIGHT EMITTING DISPLAY USING THE SAME

CROSS-REFERENCE TO RELATED APPLICATIONS

This application claims the benefit of Korean Patent Application No. 10-2008-0069527, filed on Jul. 17, 2008, in the Korean Intellectual Property Office, the disclosure of which is incorporated herein by reference.

BACKGROUND OF THE INVENTION

1. Field of the Invention

Aspects of the present invention relate to a photo sensor and an organic light emitting display using the same, and more particularly, to a photo sensor capable of reducing the interference of signals output from the photo sensor to correctly output a measured value and an organic light emitting display using the same.

2. Description of the Related Art

Recently, various flat panel displays (FPD) having less weight and volume than cathode ray tubes (CRT) have been developed. The FPDs include liquid crystal displays (LCD), field emission displays (FED), plasma display panels (PDP), and organic light emitting displays.

Among the FPDs, the organic light emitting displays display images using organic light emitting diodes (OLED) that generate light by a re-combination of electrons and holes generated in response to the flow of current.

The organic light emitting displays are widely used in personal digital assistants (PDA) and MP3 players as well as in mobile telephones due to various advantages such as high color reproducibility and small thickness.

The organic light emitting display uses a photo sensor so that the brightness of the organic light emitting display increases when an ambient light level is high, and the brightness decreases when the ambient light level is low. Thus, visibility is increased and power consumption is reduced.

The photo sensor measuring the brightness of the ambient light level transmits output signals to the organic light emitting display. Various signal lines are formed in the outline of the organic light emitting display, resulting in signals output from the photo sensor being distorted by interference from different signal lines in the outline of the organic light emitting display. Therefore, variations between the measured values transmitted to the organic light emitting displays and the measured brightness of the organic light emitting displays are caused by the distortion. Such problems deteriorate the yield and quality of the organic light emitting display.

SUMMARY OF THE INVENTION

Accordingly, aspects of the present invention provide a photo sensor capable of reducing the distortion of signals output from the photo sensor in order to output a correct measured value and an organic light emitting display using the same.

According to an aspect of the present invention, an organic light emitting display includes a pixel unit formed on a transparent substrate to display an image in response to scan signals and data signals, a scan driver generating the scan signals to transmit the scan signals to the pixel unit, a data driver generating the data signals to transmit the data signals to the pixel unit, and a photo sensor including a sensing unit sensing brightness of ambient light to output a sensing signal and a control unit receiving the sensing signal to output a brightness control signal controlling brightness of the image. The sensing unit is formed in a predetermined region of the transparent substrate and includes a first photo diode receiving a first driving power source to generate an optical current wherein a magnitude of the optical current is controlled in response to the brightness of the ambient light, a first capacitor storing the optical current, and a first switch coupled between the first driving power source and the first photo diode to perform a switching operation.

According to a another aspect of the present invention, a photo sensor senses light to generate an optical current includes a first photo diode receiving a first driving power source to generate the optical current so that a magnitude of the optical current is controlled in response to brightness of ambient light, a first capacitor storing the optical current, and a first switch coupled between the first driving power source and the first photo diode to perform a switching operation.

In the photo sensor according to aspects of the present invention and the organic light emitting display using the same, the switching error generated by the switching operation of the switch determining the driving of the photo diode can be reduced. In addition, the optical current generated by the photo diode can reduce the interference caused by noise generated by external factors.

Therefore, a deviation in the measured values of the brightness of the organic light emitting display is reduced such that it is possible to prevent yield and quality from deteriorating.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
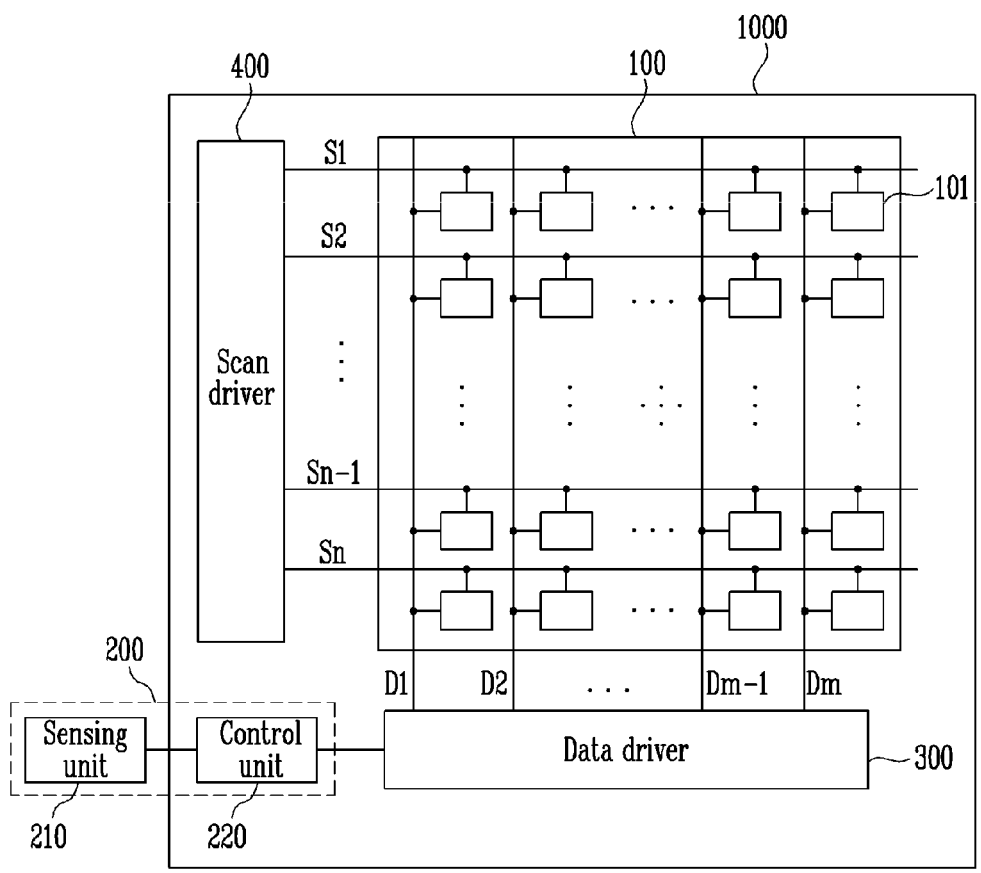
FIG. 1 illustrates the structure of an organic light emitting display according aspects of to the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, exemplary embodiments of the present invention will be described with reference to the attached drawings.

FIG. 1 illustrates the structure of an organic light emitting display according to the present invention. Referring to FIG. 1, a pixel unit 100, a photo sensor 200, a data driver 300, and a scan driver 400 are formed on a transparent substrate 1000 in the organic light emitting display.

A plurality of pixels 101 are arranged in the pixel unit 100, each of which includes an organic light emitting diode (not shown) that emits light in response to the flow of current. In the pixel unit 100, n scan lines S1, S2, . . . , Sn−1, and Sn are arranged in a row direction to transmit scan signals, and m data lines D1, D2, . . . , Dm−1, and Dm are arranged in a column direction to transmit data signals.

In addition, the pixel unit 100 receives a first power source (not shown) and a second power source (not shown) to drive the pixel unit 100. Therefore, current flows across the OLEDs through the scan signals, the data signals, emission control signals, and from the first and second power sources such that the pixel unit 100 emits light to display an image.

The photo sensor 200 includes a sensing unit 210 for sensing light and a control unit 220 for receiving a sensing signal output from the sensing unit 210 to output a brightness control signal. The sensing unit 210 measures the brightness of the ambient light to generate the sensing signal corresponding to the brightness of the ambient light. The control unit 220 receives the sensing signal to generate the brightness control signal and to output the generated brightness control signal. The brightness control signal is generated in response to the sensing signal corresponding to the brightness of the ambient light and thus, the brightness of the pixels 101 is controlled by the generated brightness control signal. The sensing unit 210 is formed on the transparent substrate 1000 and the control unit 220 is formed outside the transparent substrate 1000.

The data driver 300 generates the data signals using image signals R data, G data, and B data having red, blue, and green components. The data driver 300 is coupled to the data lines D1, D2, . . . , Dm−1, and Dm of the pixel unit 100 so as to apply the generated data signals to the pixel unit 100. In addition, the data driver 300 receives the brightness control signal to correct the image signals R data, G data, and B data in response to the sensing signal. Therefore, the data signals generated by the data driver 300 are generated in response to the sensing signal. The data driver 300 can be realized in the form of a chip. In this case, a position where the data driver 300 is to be coupled on the transparent substrate 1000 is determined. Then, the pixel unit 100, the sensing unit 210, and the scan driver 400 are formed on the transparent substrate 1000. Then, the data driver 300 is coupled to the determined position.

The scan driver 400 for generating the scan signals is coupled to the scan lines S1, S2, . . . , Sn−1, and Sn to transmit the scan signals to a specific row of the pixel unit 100. The data signals output from the data driver 300 are transmitted to the pixel 101 to which the scan signals are transmitted so that voltages corresponding to the data signals are transmitted to the pixel 101.

Figure 2:
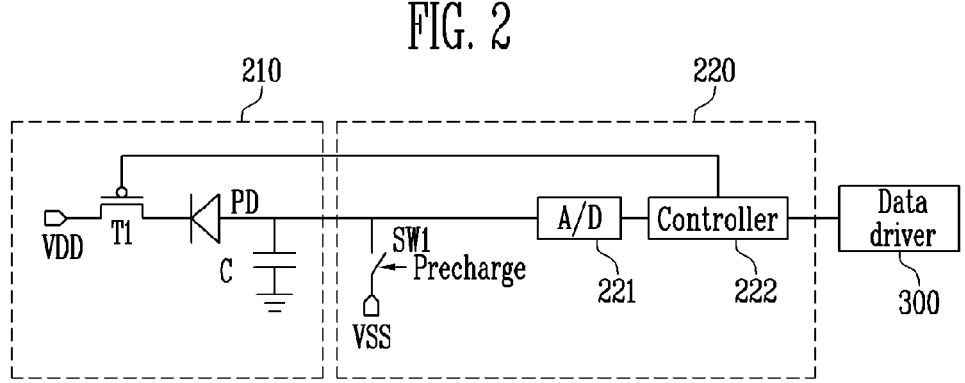
FIG. 2 is a circuit diagram illustrating a first embodiment of a photo sensor of the organic light emitting display of FIG. 1.

FIG. 2 is a circuit diagram illustrating an embodiment of the photo sensor adopted by the organic light emitting display of FIG. 1. Referring to FIG. 2, the photo sensor 200 includes the sensing unit 210 and the control unit 220. The sensing unit 210 includes a photo diode (PD), a first switch T1, and a capacitor C. The control unit 220 includes a second switch SW1, an A/D converter 221, and a controller 222.

The first switch T1 of the sensing unit 210 is realized as a PMOS transistor. A first electrode is coupled to a first driving power source VDD, and a second electrode is coupled to the cathode electrode of the photo diode PD. The first switch T1 receives a switch control signal for controlling the switching operation of the first switch T1 from the controller 222 through a gate electrode. Then, the first electrode of the capacitor C is coupled to the anode electrode of the photo diode PD and the second electrode of the capacitor C is coupled to a ground power source. When light is incident on the photo diode PD, the photo diode PD generates an optical current in response to the intensity of light. The generated optical current charges the capacitor C and a voltage formed in the capacitor C by charging the optical current is transmitted to the control unit 220. At this time, the voltage transmitted to the control unit 220 becomes the sensing signal.

The control unit 220 includes an A/D converter 221 receiving the sensing signal generated in the sensing unit 210 to output the received sensing signal as a digital signal and a controller 222 receiving the digital signal from the A/D converter 221 to generate the brightness control signal. The controller 222 controls the turning on and off of the first switch T1 to control the condensing time of the photo diode PD. In addition, the control unit 220 includes a second switch SW1 enabling the transmission of a precharge signal for precharging the capacitor C. A second driving power source VSS, having a lower voltage than the first driving power source VDD, is used for precharging the capacitor C. The precharge signal can be transmitted from the controller 222 to the second switch SW1.

At this time, since the sensing unit 210 is formed in the outline of the pixel unit 100 on the transparent substrate 1000 and the control unit 220 is formed outside the transparent substrate 1000, the capacitor C formed in the sensing unit 210 can use an empty space on the transparent substrate 1000 so that the size of the capacitor C can be increased.

As for the operation of the photo sensor 200, when the second switch SW1 is turned on by the precharge signal, the voltage charged in the capacitor C is transmitted to the second driving power source VSS having a lower voltage than the first driving power source VDD so that the capacitor C is initialized. Then, when the first switch T1 is turned on after the second switch SW1 is turned off, the photo diode PD generates the optical current by the incident light. When the brightness of the incident light is high, the amount of the generated optical current increases. When the brightness of the incident light is low, the amount of the generated optical current is reduced. That is, the amount of the optical current is generated in accordance with the brightness of the ambient light.

With the lapse of a predetermined time, the first switch T1 is turned off so that the condensing of light is stopped. When the first switch T1 is turned off, coupling between the first driving power source VDD and the photo diode PD is cut off so that the photo diode PD does not generate the optical current anymore. Therefore, the optical current is not transmitted to the capacitor C anymore. At this time, since the time for which the first switch T1 is maintained to be turned on is uniform, the amount of the optical current generated in accordance with the brightness of the ambient light varies so that the amount of the optical current charged in the capacitor C is determined only by the brightness of the ambient light.

At this time, the first switch T1 is coupled between the first driving power source VDD and the photo diode PD. This is because, when the first switch T1 is turned on and then turned off, the voltage of the cathode electrode of the photo diode PD is increased by the charge stored in the channel region of the first switch T1. At this time, the photo diode PD is coupled in an inverse bias so that the voltage of the cathode electrode is not transmitted to the control unit 220. Due to the above-described structure, switching error caused by the first switch T1 is reduced.

If the photo sensor 200 is provided in the form of a chip so that the photo diode PD is formed outside the transparent substrate 1000, the first switch T1 is not positioned between the first driving power source VDD and the photo diode PD and thus, the switching error of the first switch T1 cannot be reduced.

Figure 3A:
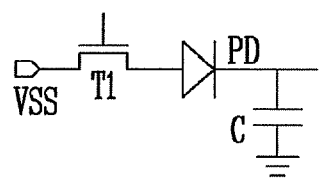
FIGS. 3A to 3C are circuit diagrams illustrating other embodiments of the sensing unit of FIG. 2.
Figure 3B:
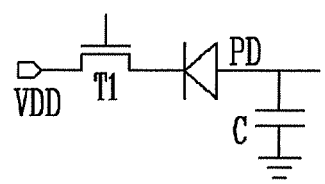
Figure 3C:
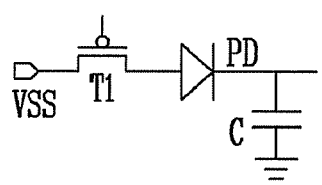

FIGS. 3A to 3C illustrate other embodiments of the sensing unit 210. In FIG. 3A, the first switch T1 is realized as an NMOS transistor and the second driving power source VSS having a (−) power source is used as a driving power source. In FIG. 3B, the first switch T1 is realized as the NMOS transistor and the first driving power source VDD having a (+) power source is used as the driving power source. In FIG. 3C, the first switch T1 is realized as a PMOS transistor and the second driving power source VSS having the (−) power source is used as the driving power source.

Figure 4:
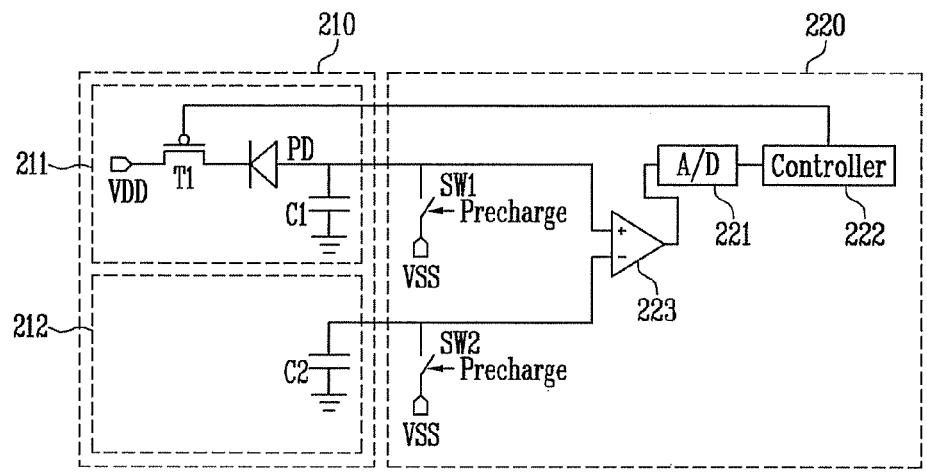
FIG. 4 is a circuit diagram illustrating a second embodiment of a photo sensor of the organic light emitting display of FIG. 1.

FIG. 4 is a circuit diagram illustrating a second embodiment of a photo sensor 200 adopted by the organic light emitting display of FIG. 1. Referring to FIG. 4, a sensing unit 210 includes a photo diode PD, a first switch T1 coupled between the photo diode PD and a first driving power source VDD, a sensing circuit 211 including a first capacitor C1 charged by the optical current generated by the photo diode PD, and a compensating unit 212 including a second capacitor C2 having the same electrostatic capacity as the first capacitor C1. A control unit 220 includes an amplifier 223 formed of a differential amplifier, an A/D converter 221 for converting an analog signal into a digital signal, and a controller 222 for outputting the brightness control signal by the digital signal output from the A/D converter 221.

The first capacitor C1 is coupled to the first input end of the amplifier 223, and the second capacitor C2 is coupled to the second input end of the amplifier 223. Second and third switches SW1 and SW2 for switching the second driving power source VSS for precharging the first capacitor C1 and the second capacitor C2 by the precharge signal are coupled to each other.

The voltage stored in the first capacitor C1 by the optical current generated by the photo diode PD changes due to the influence of peripheral signal wiring lines causing a problem. In order to solve such a problem, the second capacitor C2 having the same electrostatic capacity as the first capacitor C1 is formed. When the voltage stored in the first capacitor C1 is received by the first input end of the amplifier 223 and the voltage charged in the second capacitor C2 is received by the second input end of the amplifier 223, the amplifier 223 amplifies a difference voltage corresponding to a difference between the voltage transmitted through the first input end and the voltage transmitted through the second input end, and transmits the amplified difference voltage to the A/D converter 221.

Since the second capacitor C2 has the same electrostatic capacity as the first capacitor C1, the amount of a change in the voltage stored in the second capacitor C2 by external signal wiring lines is the same as the amount of a change in the voltage stored in the first capacitor C1 by the external signal wiring lines. Therefore, when the difference between the voltage transmitted through the first input end and the voltage transmitted through the second input end is obtained, the magnitude of the voltage generated by the optical current generated by the photo diode PD can be obtained. Therefore, the brightness control signal can be correctly generated by the compensating unit 212.

Figure 5:
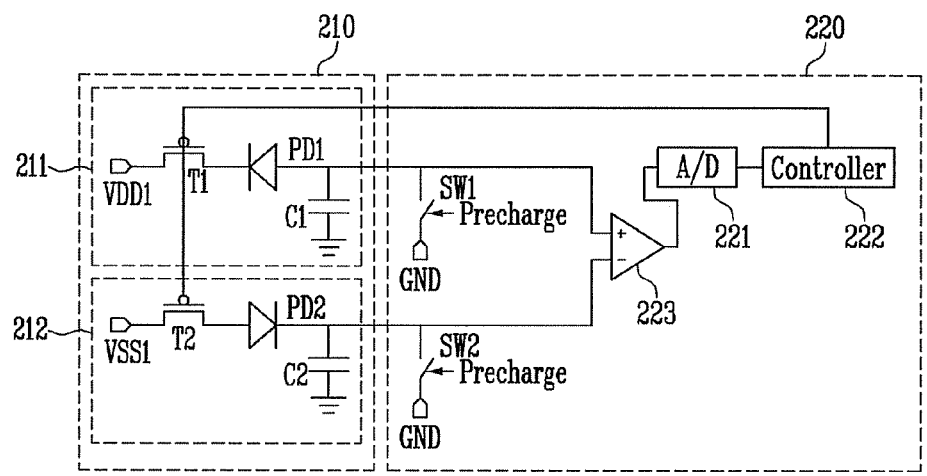
FIG. 5 is a circuit diagram illustrating a third embodiment of a photo sensor of the organic light emitting display of FIG. 1.

FIG. 5 is a circuit diagram illustrating a third embodiment of the photo sensor 200 of the organic light emitting display of FIG. 1. Referring to FIG. 5, a sensing unit 210 includes a sensing circuit 211 having a first photo diode PD1, a first switch T1 coupled between the first photo diode PD1 and a first driving power source VDD1, and a first capacitor C1 for storing the optical current generated by the first photo diode PD1 and a compensating unit 212 including a second photo diode PD2, a second switch T2 coupled between the second photo diode PD2 and a second driving power source VSS1, and a second capacitor C2 for storing the optical current generated by the second photo diode PD2. A control unit 220 includes an amplifier 223 formed of the differential amplifier, a A/D converter 221 for converting an analog signal into a digital signal, and the controller 222 for outputting the brightness control signal by the digital signal output from the A/D converter 221.

The sensing circuit 211 is coupled to the first input end of the amplifier 223, and the compensating unit 212 is coupled to the second input end of the amplifier 223. Third and fourth switches SW1 and SW2 for switching a ground power source GND for initializing the first capacitor C1 of the sensing circuit 211 and the second capacitor C2 of the compensating unit 212 are coupled to each other.

The voltage stored in the first capacitor C1 by the optical current generated by the first photo diode PD1 changes due to the influence of the peripheral signal wiring lines resulting in a problem. In order to solve such a problem, the compensating unit 212 is formed. In the compensating unit 212, unlike in the sensing circuit 211, the second driving power source VSS1, having a lower voltage than the first driving power source VDD1, is coupled to the second photo diode PD2. The anode electrode of the second photo diode PD2 is coupled to a second switch T2 and the cathode electrode of the second photo diode PD2 is coupled to the control unit 220.

Since the first switch T1 and the second switch T2 are realized as PMOS transistors and receive the same control signals, the second switch T2 is turned on when the first switch T1 is turned on and the second switch T2 is turned off when the first switch T1 is turned off.

Therefore, when a predetermined voltage is stored in the first capacitor C1 by the first photo diode PD1 in the sensing circuit 211, a predetermined voltage is stored in the second capacitor C2 by the second photo diode PD2 in the compensating unit 212. At this time, the voltage stored in the first capacitor C1 is transmitted to the first input end of the amplifier 223 and the voltage stored in the second capacitor C2 is transmitted to the second input end of the amplifier 223.

In the description of the operation of the compensating unit 212, with reference to an illustrative example, the sensing circuit 211 and the compensating unit 212 have the same structures, however, they have opposite polarities. When it is assumed that the optical voltage generated by the first photo diode PD1 due to ambient light is 1V, the optical voltage generated by the second photo diode PD2 is −1V. At this time, when noise of 0.5V is generated due to external factors such as a parasitic capacitor, the voltage stored in the first capacitor C1 is 1.5V and the voltage stored in the second capacitor is −0.5V. When the voltage stored in the first capacitor C1 is coupled to the first input end of the amplifier 223 and the voltage charged in the second capacitor C2 is coupled to the second input end of the amplifier 223, amplification caused by a difference in voltage between the two is performed.

Therefore, the photo sensor 200 uses the first and second photo diodes PD1 and PD2 such that the size of the photo diode can be reduced. The sensing circuit 211 and the compensating unit 212 can compensate for a difference in the voltage caused by noise. Due to the above reasons, the brightness control signal can be correctly generated.

Although a few embodiments of the present invention have been shown and described, it would be appreciated by those skilled in the art that changes may be made in this embodi-

What is claimed is:

1. An organic light emitting display, comprising:
a pixel unit disposed on a transparent substrate and configured to display an image in response to scan signals and data signals;
a scan driver configured to generate the scan signals and to transmit the scan signals to the pixel unit;
a data driver configured to generate the data signals and to transmit the data signals to the pixel unit;
a photo sensor comprising a sensing unit disposed on the transparent substrate and configured to sense brightness of ambient light and to output a sensing signal, and a control unit configured to receive the sensing signal and to output a brightness control signal for controlling brightness of the image,
wherein the sensing unit comprises:
a first photo diode configured to receive a first driving power source to generate optical current so that a magnitude of the optical current is controlled in response to the brightness of the ambient light;
a first capacitor configured to store a voltage corresponding to the optical current; and
a first switch coupled between the first driving power source and the first photo diode to perform a switching operation according to a switch control signal,
wherein the first switch and the first capacitor are connected to different electrodes of the first photo diode, and
wherein the control unit comprises:
an amplifier configured to receive the sensing signal output from the sensing unit coupled to a first input end of the amplifier to amplify the received sensing signal and to transmit the amplified sensing signal to an A/D converter;
the analog to digital (A/D) converter configured to receive the amplified sensing signal to convert the received amplified sensing signal into a digital signal; and
a controller configured to receive the digital signal from the A/D converter to generate the brightness control signal; and
a compensating unit configured to transmit a compensating signal to the amplifier, wherein the compensating unit is coupled to a second input end of the amplifier.

2. The organic light emitting display as claimed in claim 1, wherein the controller controls the turning on and off of the first switch.

3. The organic light emitting display as claimed in claim 1, wherein the compensating signal has an opposite polarity of the sensing signal.

4. The organic light emitting display as claimed in claim 1, wherein the compensating unit comprises a second capacitor having the same electrostatic capacity as the first capacitor, the second capacitor being coupled to the second input end of the amplifier.

5. The organic light emitting display as claimed in claim 4, wherein the control unit comprises:
a second switch configured to switch a voltage to initialize the first capacitor; and
a third switch configured to switch a voltage to initialize the second capacitor.

6. The organic light emitting display as claimed in claim 1, wherein the compensating unit comprises:
a second photo diode configured to receive a driving power source from a second driving power source having a lower voltage than the first driving power source;
a second switch switching coupling the driving power source and the second photo diode together according to the controller; and
a second capacitor configured to store optical current generated by the second photo diode.

7. The organic light emitting display as claimed in claim 6, wherein the control unit comprises:
a second switch configured to switch a voltage to initialize the first capacitor; and
a third switch configured to switch a voltage to initialize the second capacitor.

8. The organic light emitting display as claimed in claim 6, wherein the first photo diode comprises a cathode electrode coupled to the first switch and an anode electrode coupled to the first capacitor, and
wherein the second photo diode comprises a cathode electrode coupled to the second capacitor and an anode electrode coupled to the second switch.

9. A photo sensor, comprising:
a first photo diode coupled to a first driving power source and configured to generate an optical current having a magnitude that corresponds to brightness of ambient light;
a first capacitor configured to store a voltage corresponding to the optical current, the stored voltage corresponding to a sensing signal;
a first switch coupled between the first driving power source and the first photo diode to perform a switching operation to selectively transmit the sensing signal;
a control unit configured to control the switching operation according to a switch control signal,
wherein the first switch and the first capacitor are connected to different electrodes of the first photo diode, and
wherein the control unit comprises:
an amplifier configured to receive the sensing signal output from a sensing unit coupled to a first input end of the amplifier, to amplify the received sensing signal, and to transmit the amplified sensing signal to an A/D converter, wherein the sensing unit comprises the first photodiode, the first capacitor, and the first switch;
the analog to digital (A/D) converter configured to receive the amplified sensing signal to convert the received amplified sensing signal into a digital signal; and
a controller configured to receive the digital signal from the A/D converter to generate a brightness control signal; and
a compensating unit configured to transmit a compensating signal to the amplifier, wherein the compensating unit is coupled to a second input end of the amplifier.

10. The photo sensor as claimed in claim 9, wherein the controller is configured to turn on and off the first switch.

11. The photo sensor as claimed in claim 9, wherein the compensating signal has an opposite polarity of the sensing signal.

12. The photo sensor as claimed in claim 9, wherein the compensating unit comprises a second capacitor having the same electrostatic capacity as the first capacitor, the second capacitor being coupled to the second input end of the amplifier.

13. The photo sensor as claimed in claim 12, wherein the control unit comprises:

a second switch configured to switch a voltage to initialize the first capacitor; and a third switch configured to switch a voltage to initialize the second capacitor.

14. The photo sensor as claimed in claim 9, wherein the compensating unit comprises:

a second photo diode configured to receive a driving power source from a second driving power source having a lower voltage than the first driving power source;

a second switch switching coupling the driving power source and the second photo diode together according to the controller; and a second capacitor configured to store optical current generated by the second photo diode.

15. The photo sensor as claimed in claim 14, wherein the control unit comprises:

a second switch configured to switch a voltage to initialize the first capacitor; and a third switch configured to switch a voltage to initialize the second capacitor.

16. The photo sensor as claimed in claim 14, wherein the first photo diode comprises a cathode electrode coupled to the first switch and an anode electrode coupled to the first capacitor, and wherein the second photo diode comprises a cathode electrode coupled to the second capacitor and an anode electrode coupled to the second switch.

17. A photo sensor, comprising:

a light sensor configured to provide an output current corresponding to a measurement of ambient light incident upon the light sensor; and a controller configured to control the output current of the light sensor to reduce deviations of the output current, wherein the light sensor comprises:

a photo diode configured to receive a first driving power source to generate the output current so that a magnitude of the output current is controlled in response to brightness of ambient light;

a capacitor configured to store a voltage corresponding to the output current and corresponding to an analog voltage signal; and a first switch coupled between the first driving power source and the photo diode to perform a switching operation according to the output of the controller, wherein the first switch and the capacitor are connected to different electrodes of the photo diode, and wherein the controller comprises:

a second switch configured to initialize the capacitor with a voltage;

an analog to digital (A/D) converter configured to convert the analog voltage signal into a digital voltage signal; and a control unit configured to receive the digital voltage signal from the A/D converter to generate a switch control signal switching the first switch.

18. The photo sensor of claim 17, wherein the output of the controller turns on and off the first switch to reduce deviations in the output current.

* * * * *